US007878759B2

(12) United States Patent
Mills et al.

(10) Patent No.: US 7,878,759 B2
(45) Date of Patent: Feb. 1, 2011

(54) MITIGATION OF UNSTEADY PEAK FAN BLADE AND DISC STRESSES IN TURBOFAN ENGINES THROUGH THE USE OF FLOW CONTROL DEVICES TO STABILIZE BOUNDARY LAYER CHARACTERISTICS

(75) Inventors: Robert J. Mills, Richmond Hill, GA (US); Preston A. Henne, Hilton Head Island, SC (US)

(73) Assignee: Rolls-Royce Deutschland Ltd & Co KG (DE)

( * ) Notice: Subject to any disclaimer, the term of this patent is extended or adjusted under 35 U.S.C. 154(b) by 0 days.

(21) Appl. No.: 10/710,723

(22) Filed: Jul. 30, 2004

(65) Prior Publication Data

US 2005/0163621 A1  Jul. 28, 2005

Related U.S. Application Data

(63) Continuation of application No. PCT/US2004/009897, filed on Mar. 26, 2004.

(60) Provisional application No. 60/481,889, filed on Jan. 13, 2004, provisional application No. 60/481,820, filed on Dec. 20, 2003.

(51) Int. Cl.
   *F01D 5/14* (2006.01)
(52) U.S. Cl. .................. 416/1; 416/61; 416/236 R; 416/241 R
(58) Field of Classification Search .............. 415/914, 415/118; 416/1, 61, 236 R, 229 R, 230, 241 R
   See application file for complete search history.

(56) References Cited

U.S. PATENT DOCUMENTS 1,862,827 A    6/1932  Parsons et al.

(Continued)

FOREIGN PATENT DOCUMENTS

DE         38 21 005 C2    1/1992

(Continued)

OTHER PUBLICATIONS

U.S. Appl. No. 10/817,739.

(Continued)

*Primary Examiner*—Ninh H Nguyen
(74) *Attorney, Agent, or Firm*—Timothy J. Klima; Shuttleworth & Ingersoll, PLC

(57) ABSTRACT

Method and apparatus for providing a turbofan blade 40 adapted to initiate and control a boundary layer transition at a side surface of the blade 40 during operation as a component in a turbofan assembly 35. The turbofan blade 40 includes a leading edge 55, a trailing edge 58, and two side surfaces including a high-pressure side surface 49 and a low-pressure side surface 52. At least one of the two side surfaces has an essentially smooth surface portion 61 located between the leading and trailing edges, and the essentially smooth surface portion is interrupted by a surface deviation 64. The surface deviation is configured to fix a positionally unstable laminar to turbulent boundary layer transition 24 at a location toward the trailing edge from the surface deviation during operation of the turbofan blade in the turbofan assembly. In this manner, fatigue inducing and/or structurally damaging unsteady aerodynamic forces experienced upon the blade and/or fan disc during operation are controlled, and the resultant fluctuating fan blade and disc peak stresses are mitigated.

49 Claims, 10 Drawing Sheets

U.S. PATENT DOCUMENTS

| | | | |
|---|---|---|---|
| 1,903,823 A | 4/1933 | Loughecd | |
| 3,000,401 A | 9/1961 | Ringleb | |
| 3,294,366 A | 12/1966 | Coplin | |
| 3,304,056 A | 2/1967 | Sohma | |
| 3,365,126 A | 1/1968 | Stoffer | |
| 3,403,893 A | 10/1968 | Stoffer | |
| 3,578,264 A * | 5/1971 | Kuethe | 244/200.1 |
| 3,881,669 A | 5/1975 | Lessen | |
| 4,727,751 A | 3/1988 | Holmes et al. | |
| 4,822,249 A | 4/1989 | Eckardt et al. | |
| 4,936,146 A | 6/1990 | Stack et al. | |
| 4,975,023 A | 12/1990 | Miura et al. | |
| 5,069,403 A | 12/1991 | Merentic | |
| 5,169,290 A * | 12/1992 | Chou | 416/236 R |
| 5,209,644 A | 5/1993 | Dorman | |
| 5,313,700 A * | 5/1994 | Dorman | 29/889.7 |
| 5,540,406 A | 7/1996 | Occhipinti | |
| 5,785,498 A | 7/1998 | Quinn | |
| 6,139,258 A | 10/2000 | Lang, III et al. | |
| 6,183,197 B1 | 2/2001 | Bunker | |
| 6,264,429 B1 | 7/2001 | Koeller | |
| 6,358,012 B1 | 3/2002 | Staubach | |
| 6,416,289 B1 * | 7/2002 | Ramesh et al. | 416/235 |
| 6,471,485 B1 | 10/2002 | Rossmann | |
| 6,538,887 B2 | 3/2003 | Belady | |
| 6,638,021 B2 | 10/2003 | Olhofer | |
| 7,251,592 B1 | 7/2007 | Praisner et al. | |

FOREIGN PATENT DOCUMENTS

| | | |
|---|---|---|
| DE | 10054244 | 6/2002 |
| EP | 0132638 | 2/1985 |
| EP | 0937862 | 8/1999 |
| EP | 0954701 | 11/1999 |
| EP | 1081332 | 3/2001 |
| FR | 2282548 | 3/1976 |
| GB | 347138 | 4/1931 |
| GB | 580806 | 9/1946 |
| GB | 750305 | 6/1956 |
| GB | 2032048 | 4/1980 |
| WO | 98/22711 | 5/1998 |

OTHER PUBLICATIONS

U.S. Appl. No. 10/870,437.

Patent Abstracts of Japan, Pub. No. 2003056494A, Feb. 2003.

European Search Report dated Oct. 7, 2009 from counterpart European patent application.

* cited by examiner

MITIGATION OF UNSTEADY PEAK FAN BLADE AND DISC STRESSES IN TURBOFAN ENGINES THROUGH THE USE OF FLOW CONTROL DEVICES TO STABILIZE BOUNDARY LAYER CHARACTERISTICS

CROSS-REFERENCE TO RELATED PATENT APPLICATIONS

The present application claims the benefit of U.S. Provisional Application Nos. 60/481,820 filed 20, Dec. 2003 and 60/481,889 filed 13, Jan. 2004. The present application is also a continuation of International Patent Application No. PCT/US2004/009897 filed 26, Mar. 2004 which was published in English pursuant to Article 21(2) of the Patent Cooperation Treaty; all of said applications, in their entireties, being hereby expressly incorporated by reference into the present application.

TECHNICAL FIELD

This invention provides a method to mitigate the peak fluctuating stresses in turbofan fan blades and/or fan discs, a task accomplished through the control of fatigue inducing and/or structurally damaging unsteady aerodynamic forces that develop when a positionally unstable transition from a laminar to turbulent boundary layer exists on an untreated fan blade. Stabilized transition from a laminar to turbulent boundary layer is achieved through the strategic installation of aerodynamic control devices located on the external contour of the fan blade. Application of this invention is directed to operating systems that incorporate such fan blades. Typically, this will include commercial and military aviation applications that employ turbofan engine technologies for their propulsion systems. However, implementation of this invention may also be applied to applications in the marine, rail, automotive and/or power generation industries in which jet engine technologies are sometimes employed.

BACKGROUND ART

Competition within the commercial and military aviation industries has compelled airframe manufacturers to develop aircraft that operate over ever-increasing flight envelopes. Modern advances in turbofan engine design and development have strived to improve the operating efficiencies of aircraft powerplants to keep abreast of these demands. One such advancement has been the implementation of sophisticated technologies and concepts in the aerodynamic design of fan or compressor blades for turbofan engines. However, in some instances, the engine manufacturer in providing a design to satisfy the airframe manufacturer's demands inadvertently generates an unfavorable aerodynamic characteristic, which impacts the operation of the system within its design envelope. On such occasions, the engine may experience operating difficulties that limit the performance of the aircraft, and in some cases, impact the structural integrity of the engine and/or its components.

As fan blade designs become more highly evolved to accommodate larger operating envelopes, the frequency at which these flow problems are encountered will increase. The scope and characteristic of these disturbances are varied and can include local flow separation on the fan blade or in some cases the establishment of unsteady aerodynamic loadings propagated by unfavorable boundary layer and shock wave development. On occasion, such fluctuations can match the resonant frequencies of the blade and disc assembly and generate further amplification of the detrimental effects at the fan blade and the associated stresses that are induced, particularly at the interconnection between the blade and disc.

These characteristics may occur at the corners of the operating envelope, or in rare cases may develop at or near the principal operating point for the engine and/or airframe. Prolonged exposure to these undesirable conditions may produce structural degradation of the fan blade and/or eventual catastrophic failure of the assembly. Without a viable solution to correct these characteristics the manufacturer is forced to impose operational and maintenance limitations on the turbofan assembly, which limits the aircraft's operating envelope, and the useful life and durability of the engine(s), and in some cases the airworthiness of the airframe. These limitations precipitate unforeseen costs for the operators through increased down time, elevated inspection periods and higher maintenance costs.

One purpose of the invention disclosed herein is to stabilize the boundary layer flow on the engine fan or compressor blades to mitigate fluctuating peak stresses sometimes experienced in the fan blade and fan disc under normal operations. The invention is a unique application of aerodynamic boundary layer control devices to this specialized flow problem in engine fan or compressor blade design.

Flow passing adjacent to the surface of a turbofan fan blade is dominated by the viscous characteristics of the air. This region of airflow is referred to as the boundary layer, and is characterized as either laminar or turbulent. The chordwise extent of the laminar and turbulent flow on the fan blade will depend upon atmospheric conditions, the operation of the engine and the geometry of the blade. A region of laminar flow will normally develop at the leading edge of the fan blade. Some distance downstream, the boundary layer will transition from laminar to turbulent flow. The chordwise location of the transition point will often vary along the length of the blade between its root and tip (see 23 in FIG. 1). Under normal conditions this transition point which identifies the end of laminar flow and the start of turbulent flow will occur at a nominally static point between the leading and trailing edge of the fan blade.

The operating efficiency of the fan or compressor blade may be greatly enhanced if its aerodynamic drag is maintained at a low level. One method to accommodate this goal is to develop and sustain a laminar boundary layer over the surface of the fan blade. Recent advancements in modern fan blade design have seen the development of airfoil geometries characterized by increasingly large regions of chordwise laminar flow. In such a laminar boundary layer, the air moves downstream over the blade following a relatively smooth trajectory and without appreciable mixing between different layers of the air stream. It is also known that certain airfoil configurations can generate or promote laminar flow. These types of airfoils are sometimes referred to as low drag or "laminar flow" airfoils, and are designed specifically for this purpose.

Other airfoil designs, such as those found in modern fan or compressor blades, may experience large regions of laminar flow simply because of their characteristic dimensions and/or the conditions under which they operate. In such examples, the thickness of the fan blade relative to its chord length is small and the blades operate at combinations of airspeed, altitude and ambient temperature where conditions are favorable for the development of a laminar boundary layer over a large percentage of the fan blade chord. Under these conditions the thickness of the laminar boundary layer will increase along the chord of the fan blade as air is entrained into the boundary layer. The principal mechanism responsible for the entrainment of additional air into the boundary layer is the viscous or shearing forces existing between adjacent layers of air. When the laminar boundary layer thickens, however, it becomes unstable and extremely sensitive to slight flow disturbances or geometric differences (in some cases caused by manufacturing tolerances) in the associated fan blade which can promote premature transition to a turbulent boundary layer. The chordwise location on the fan blade at which this transition occurs is referred to as the transition point, the position of which becomes relatively unstable the further the laminar boundary layer extends from the leading edge of the fan blade rearward along its chord.

Downstream of the transition point, the flow is turbulent and is characterized by an irregular or random motion superimposed upon the average or mean downstream flow and involves significant mixing of mass and momentum between layers of air within the boundary layer. This randomized mixing generates an exchange of momentum between the lower speed flow within the boundary layer and the higher speed flow outside the boundary layer. Entrainment of air into the turbulent boundary layer, generated by turbulent mixing, causes the boundary layer to thicken much faster than the more steady state laminar boundary layer. The increased thickness of the turbulent boundary layer alters the flow characteristics on adjacent fan blades and in the passage between these blades. These changes produce variations in most flow field parameters, including static pressure, velocity and mass flow.

In the more common case of compressible flow, a shock wave will often develop in the passage between adjacent fan blades. Under these conditions the thickness of the boundary layer has a direct influence on the chordwise position of the shock wave. On occasion, any chordwise oscillatory motion of the transition point will produce significant and unsteady changes in the position of the shock wave on the chord of the fan blade. Whenever the transition point is located upstream, or ahead of the shock wave, the chordwise position of the shock wave will move in response to any unsteadiness in the thickness of the turbulent boundary layer propagated by instabilities in the laminar to turbulent boundary layer transition point. In other applications, the chordwise movement of the shock wave will be directly affected by the movement of the transition point whenever the shock wave is located at the same chordwise position as the transition point, or in its immediate vicinity.

Promoting large regions of laminar flow will produce a higher operating efficiency for the powerplant and increased performance for the aircraft. However, a large region of laminar flow is often terminated by an unstable transition to a turbulent boundary layer which is characterized by an erratic and/or unsteady streamwise movement of the transition point along the chord of the fan blade. Fluctuations in the position of the transition point will impact the thickness of the turbulent boundary layer that forms immediately downstream of this location. Changes in the thickness of the turbulent boundary layer along the fan blade surface influence the flow characteristics on and between adjacent blades. Any unsteadiness in these flow characteristics will produce fluctuations in the aerodynamic loads on the fan blades, which in turn expose the blade and disc material to cyclic stresses with the potential to produce structural degradation, cracking and ultimately failure of the fan assembly.

Traditional methods utilized to resolve flow disturbances on engine fan blades include the application of grooves in the engine inlet casing and/or the cropping and grooving of the fan blade tips in an attempt to dampen the unsteady aerodynamic loading on the fan blades and disc. However, these techniques do not address the source of the aerodynamic problem identified herein, and provide only limited success in resolving the fundamental problem for which the invention described herein has been developed.

A primary goal of the present invention is to suppress any oscillations in the aerodynamic load on the fan blade and any tendency for subsequent structural resonance. This invention achieves this purpose by stabilizing the unsteady transition between a laminar and turbulent boundary layer located on the surface of the fan blade through the application of aerodynamic control devices to resolve this unique problem. The success of the present invention to reduce and stabilize the fluctuating fan blade and disc stresses is achieved by the strategic placement of the invention on the turbofan fan blade.

DISCLOSURE OF INVENTION

Compared to the heretofore described traditional methods, this invention provides a more direct, powerful and efficient tool to reduce or eliminate unsteady aerodynamic flow effects existing on turbofan fan or compressor blades. Implementation ensures reduced blade and disc stresses and resonance levels during flight operations thereby extending fan blade life through the avoidance of at least blade and disc cracking and the subsequent catastrophic structural failure of the disc assembly. Among other benefits, the invention is easy and cost effective to implement; is extremely effective and efficient in reducing fan blade and disc stresses; and the prescribed adaptations and/or devices are passive in nature, and once installed, require substantially no attention or monitoring.

As described above, a primary purpose of this invention is the stabilization and strategic positioning of the transition point between laminar and turbulent flow on an operating turbofan fan blade. The invention utilizes features that initiate boundary layer transition at a specific location on the turbofan fan blade, thereby eliminating the previously experienced detrimental stresses imposed upon the untreated turbofan assembly.

However, the physical structures by which such a feature is fabricated and/or implemented on the fan blade is of secondary importance to the innovation of utilizing the feature in the described environment of a fan blade, and has heretofore been unknown.

During prototype testing of the present invention, eighty to ninety percent reductions in peak stress levels were consistently recorded in the fan disc assembly of a turbofan engine prone to reduced cycle cracking of its fan disc. Benefits of the present invention include not only the methods and arrangements for providing the stress-relieving treatments, but also their promotion for purposes of operating envelope expansion, product sales and differentiation.

MODE FOR THE INVENTION

Figure 1:
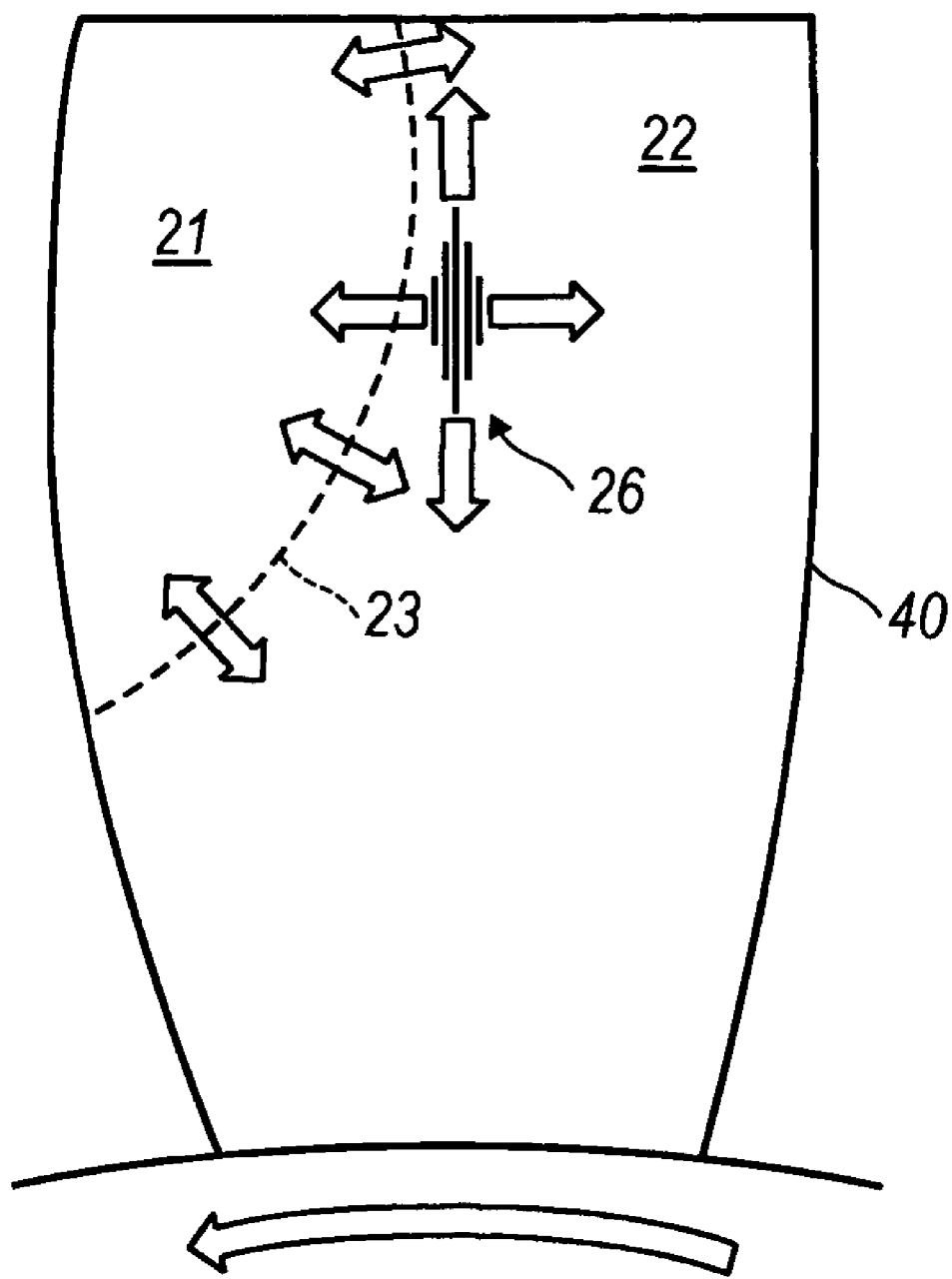
FIG. 1 illustrates a plan view of an untreated turbofan fan blade.

In the description below and the accompanying drawings, various aspects of treated and untreated turbofan blades, and their incorporating structures, are described and illustrated. In that regard, the following reference numerals have been utilized to designate these features.

jet aircraft
region of laminar flow
region of turbulent flow
unstable laminar to turbulent boundary layer transition zone
positionally stabilized boundary layer transition
positionally steady aerodynamic force
positionally unsteady aerodynamic force
range of movement of unsteady aerodynamic load
distance from leading edge of fan blade
turbofan based power unit
turbofan assembly
fan disc
turbofan blade
fan blade tip
chord length
torsional axis of turbofan blade
high-pressure side of turbofan fan blade
low-pressure side of turbofan fan blade
leading edge of fan blade
trailing edge of fan blade
essentially smooth surface portion
surface deviation (departure)
reduced-elevation surficial portion
raised-elevation surficial portion
elongate strip-shaped area of raised elevation
thickness of feature
width of feature
length of feature
tip of feature
laminar-to-turbulent boundary layer transition means (feature).

Figure 2:
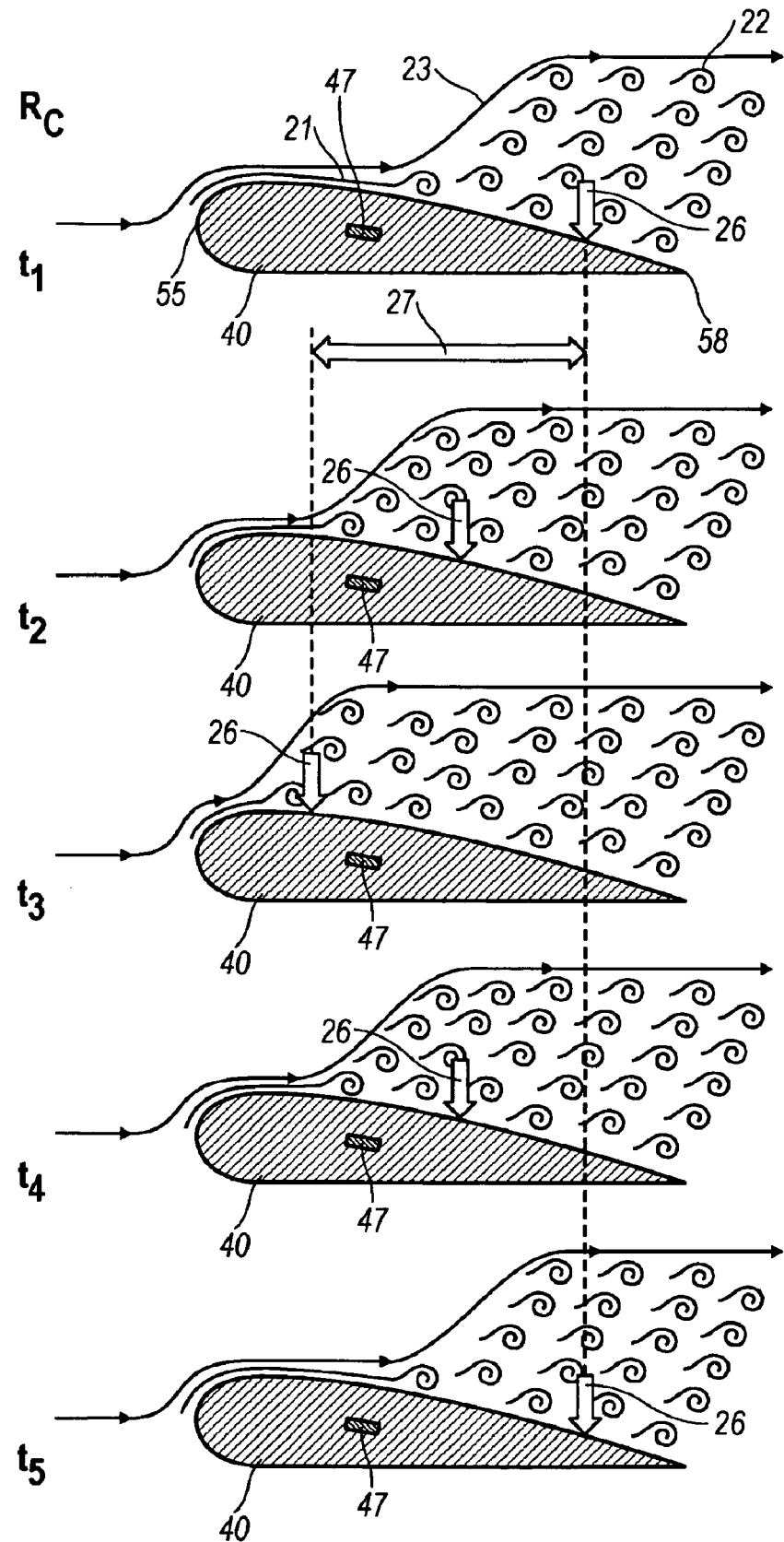
FIG. 2 illustrates an untreated turbofan fan blade experiencing a cyclic or unsteady aerodynamic loading.
Figure 3:
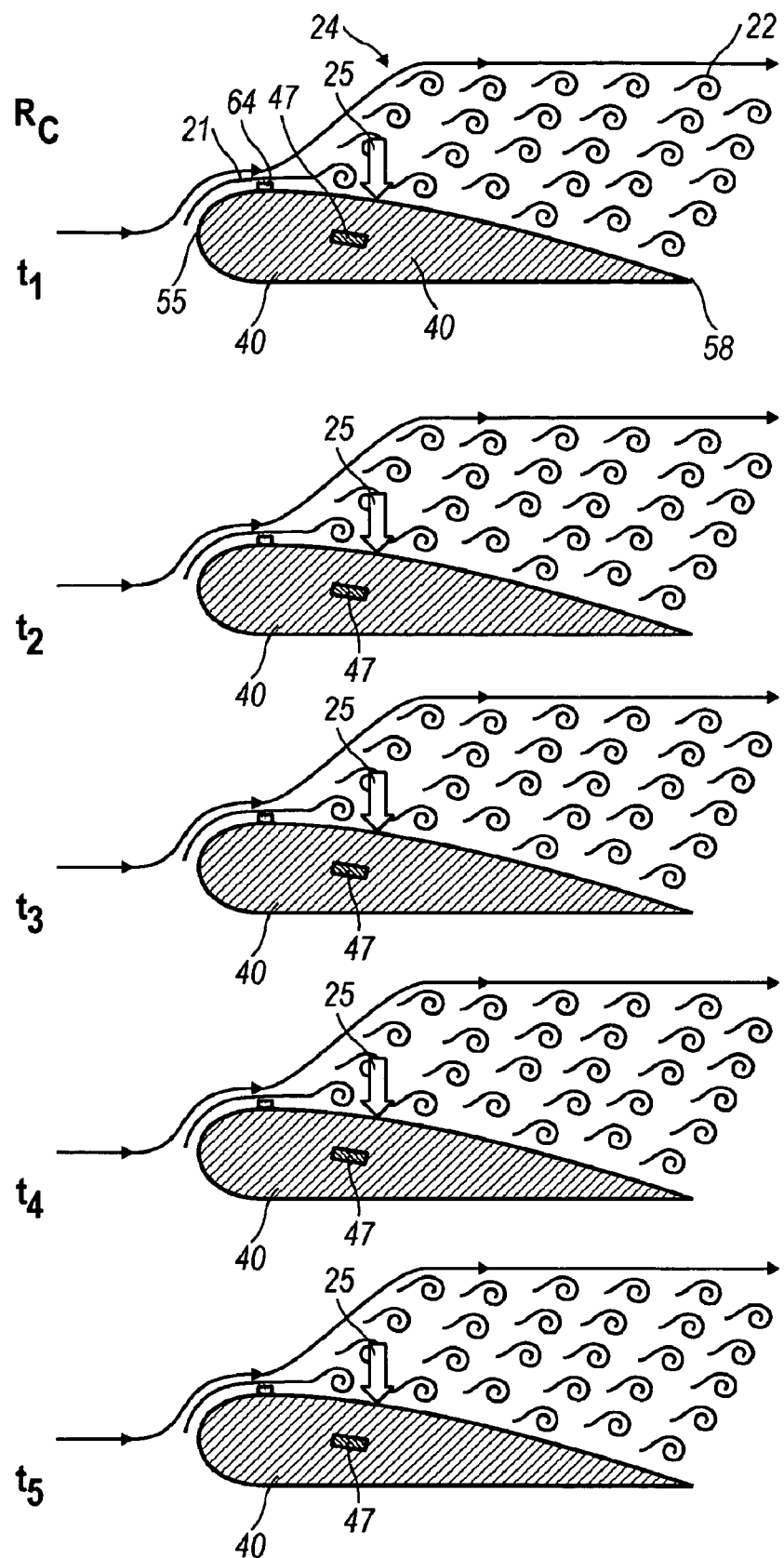
FIG. 3 illustrates a laminar-to-turbulent boundary layer transition feature configured within the scope of the present invention and producing a stabilized aerodynamic loading.

FIG. 1 shows a positionally unsteady aerodynamic force moving on an untreated fan blade. (It is noted that the aerodynamic loading on the fan blade is distributed over the surface of the blade. However, to simplify explanation of the concepts presented herein, the aerodynamic loading is represented in the figures as a point load placed at a nominal position on the fan blade.) The chordwise movement of the unsteady aerodynamic force is in response to an unsteadiness in the laminar to turbulent boundary layer transition on the surface of the fan blade (see FIG. 2). The present invention uses laminar-to-turbulent boundary layer transition control devices or features, attached or integrated on/in the turbofan fan blade, to stabilize the flow field adjacent to the fan blade (see FIG. 3), producing a subsequent reduction in the peak fluctuating stresses which develop in the fan disc.

Figure 6:
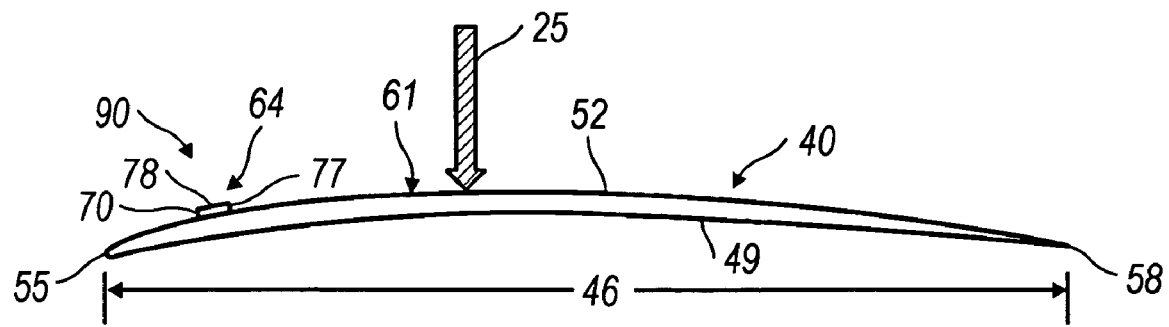
FIG. 6 is a schematic side or cross-sectional view of a fan blade adapted with a raised transition device.
Figure 7:
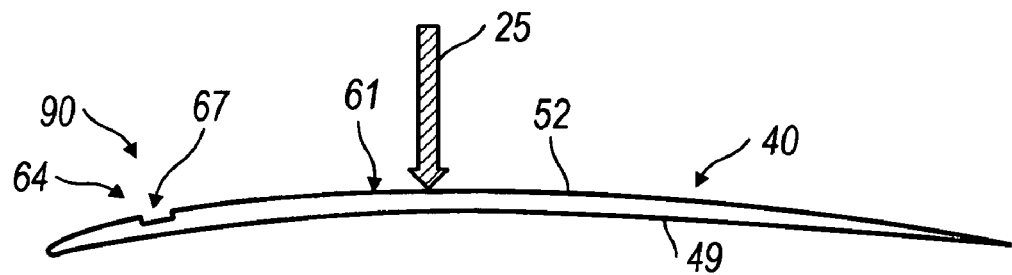
FIG. 7 is a schematic side or cross-sectional view of a fan blade with a recessed adaptation which constitutes another version of the transition feature or device.

Surface treatments and adaptations, which can be utilized to accomplish the present invention(s), comprise: (1) those that extend off or rise above the fan blade surface (illustrated in FIG. 6) and include, but are not limited to grit placement, vortex generators, beads, turbulators, raised trip strips, and (2) those that protrude or are recessed into the fan blade (illustrated in FIG. 7) and can take the form of variously shaped recesses in the exterior side surface of the fan blade, and that are configured to stabilize the boundary layer on the fan blade surface either by fixing or setting the transition point between laminar to turbulent flow, or by reattaching a separated boundary layer.

Figures 8, 9, 10:
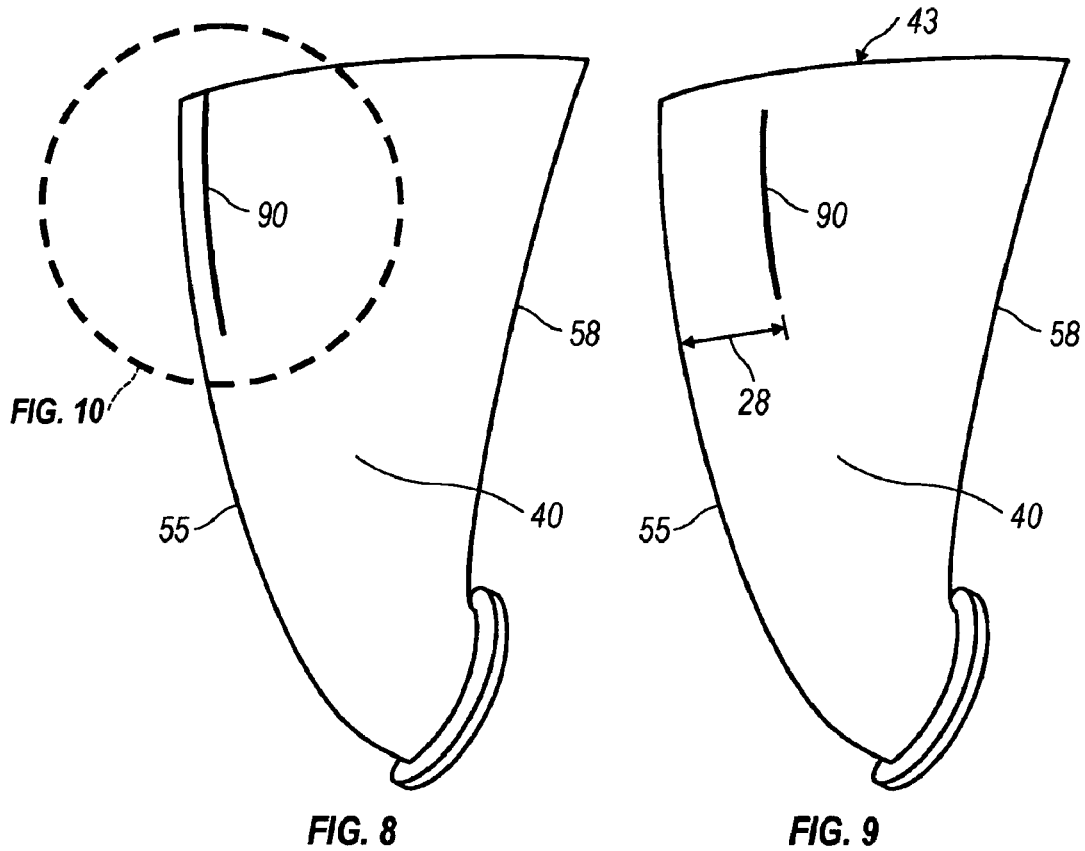
FIG. 8 is a perspective view of an adapted fan blade configured according to the example of FIG. 4 and in which the blade treatment is located near the leading edge of the fan blade.
FIG. 9 is a perspective view of an adapted fan blade configured according to the example of FIG. 5 and in which the blade treatment is located further rearward on the chord than shown in FIG. 8.
FIG. 10 is a detailed view of the treated area of the blade of FIG. 8.

Typical implementations of this invention are shown in FIGS. 8 and 9. A detail of one embodiment of the invention is depicted in FIG. 10. Here, a feature (90) has been located on the high-speed (low-pressure) side (52) of a turbofan fan blade (40). The feature (90) is located toward the leading edge (55) of the fan blade (40) and extends from the tip (43) of the blade, inward. In this application, the feature is constituted by grit bonded to the blade using a high strength epoxy. Subsequent testing of these adapted arrangements (which will be described in greater detail hereinbelow) showed a surprising 80 to 90 percent reduction in fan disc stresses. In one example at flight conditions above 35,000 feet, previously excessive fan disc stresses in an untreated turbofan assembly were reduced to less than 10 MPa with the feature installed. In another example, a reduction to less than 20 MPa was achieved. In a collection of observed examples, the reductions were consistently below a level previous considered to be acceptable, that previous level being 50 MPa.

The preferred region for application of the transition feature on the fan blade is upstream of the laminar to turbulent boundary layer transition point on the untreated fan blade. In this tested case, the invention was applied approximately five percent downstream of the fan blade leading edge (55). However, the chordwise location of the invention between the leading and trailing edge of the fan blade may vary depending upon the application. In some cases this can be as much as thirty to forty percent (see (90) in FIG. 9), but the feature must always be forward of the chordwise position of the laminar to turbulent boundary layer transition point on the untreated blade.

Equally, the spanwise length of the strip from the blade root to tip may also vary. In the applications described herein, initial testing of the invention employed a six-inch length strip, which extended from the tip of the blade (43) toward the root or disc (see FIG. 10). Further testing showed that similar fan disc stress levels could be obtained by reducing the length

(80) of the strip (90) to two inches, resulting in only a marginal increase in peak stress levels compared to the longer strips.

In a further embodiment of the invention, it was shown that successful use of this feature could be achieved by limiting its application at the tip (43) of the fan blade (40). In this region, the boundary layer on the inlet casing wall interacts with the boundary layer on the fan blade tip to cause transition to turbulent flow at the fan blade leading edge rendering application of the invention in this region of the fan blade ineffectual. During prototype testing, the feature (90) was installed one-half of an inch, and one inch, respectively, from the tip of the fan blade without a significant change occurring in the fan disc peak stresses.

In an alternative embodiment of the invention, the raised height (77) of the feature (90) above the smooth blade varies depending on engine operating speed, atmospheric conditions (including altitude and ambient temperature) and fan blade geometry. However, prototype testing showed that successful reductions in fan disc stresses were obtained when the raised height of the strip was between 0.005 to 0.020 inches. Use of strip heights beyond these limits is also practicable but should be established based upon atmospheric conditions and the operating characteristics of the turbofan engine.

Referring to FIGS. 3-15, the invention is implemented on a turbofan blade (40) to establish a laminar-to-turbulent boundary layer transition (24) at a side surface of the blade (40) during operation as a component in a turbofan assembly (35). The turbofan blade (40) includes a leading edge (55), a trailing edge (58), and two side surfaces including a high-pressure side surface (49) and a low-pressure side surface (52). At least one of the two side surfaces has an essentially smooth surface portion (61) located between the leading and trailing edges, and the essentially smooth surface portion is interrupted by a surface deviation (64) constituting a laminar-to-turbulent boundary layer transition feature (90) at a distance (28) from the leading edge (55). The surface deviation is configured to induce a positionally stabilized transition from laminar to turbulent flow (24) at a location toward the trailing edge (58) from the surface deviation during operation of the turbofan blade in the turbofan assembly (35). In this manner, unsteady aerodynamic forces existing upon the untreated blade during operation are reduced or eliminated with the installation of this feature, and the stresses in the previously untreated fan blade and disc are stabilized and reduced.

Figure 12:
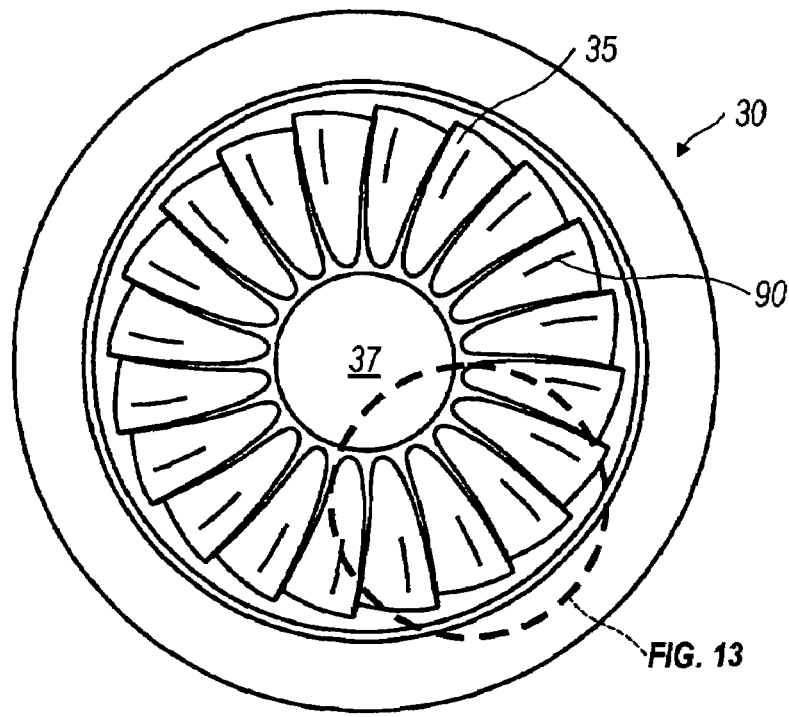
FIG. 12 is a perspective view of a turbine engine incorporating a turbofan assembly containing fan blades adapted according to the present inventions.
Figure 13:
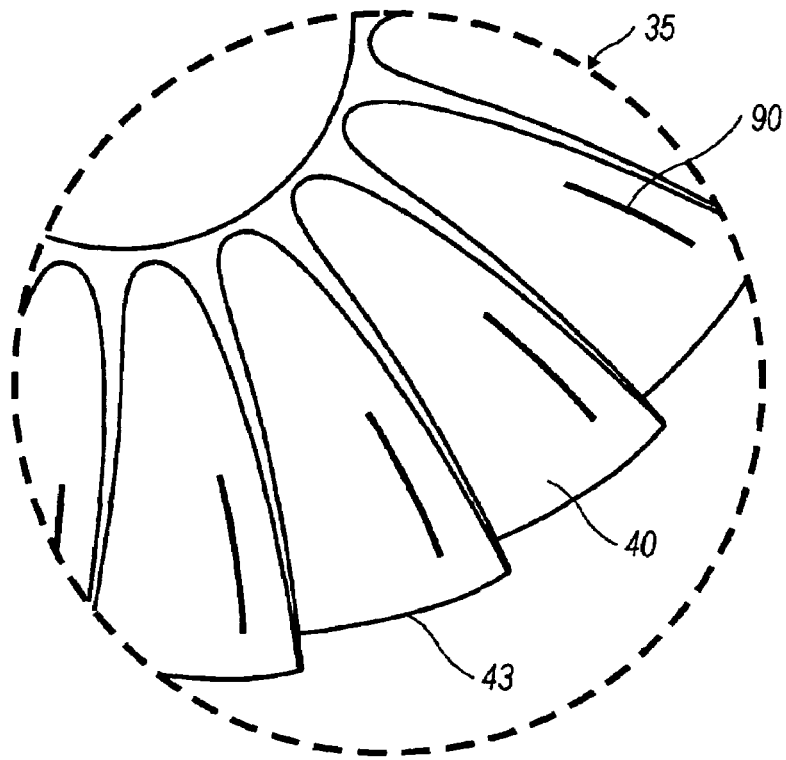
FIG. 13 is a detailed view of several of the treated turbofan blades of FIG. 12.
Figure 14:
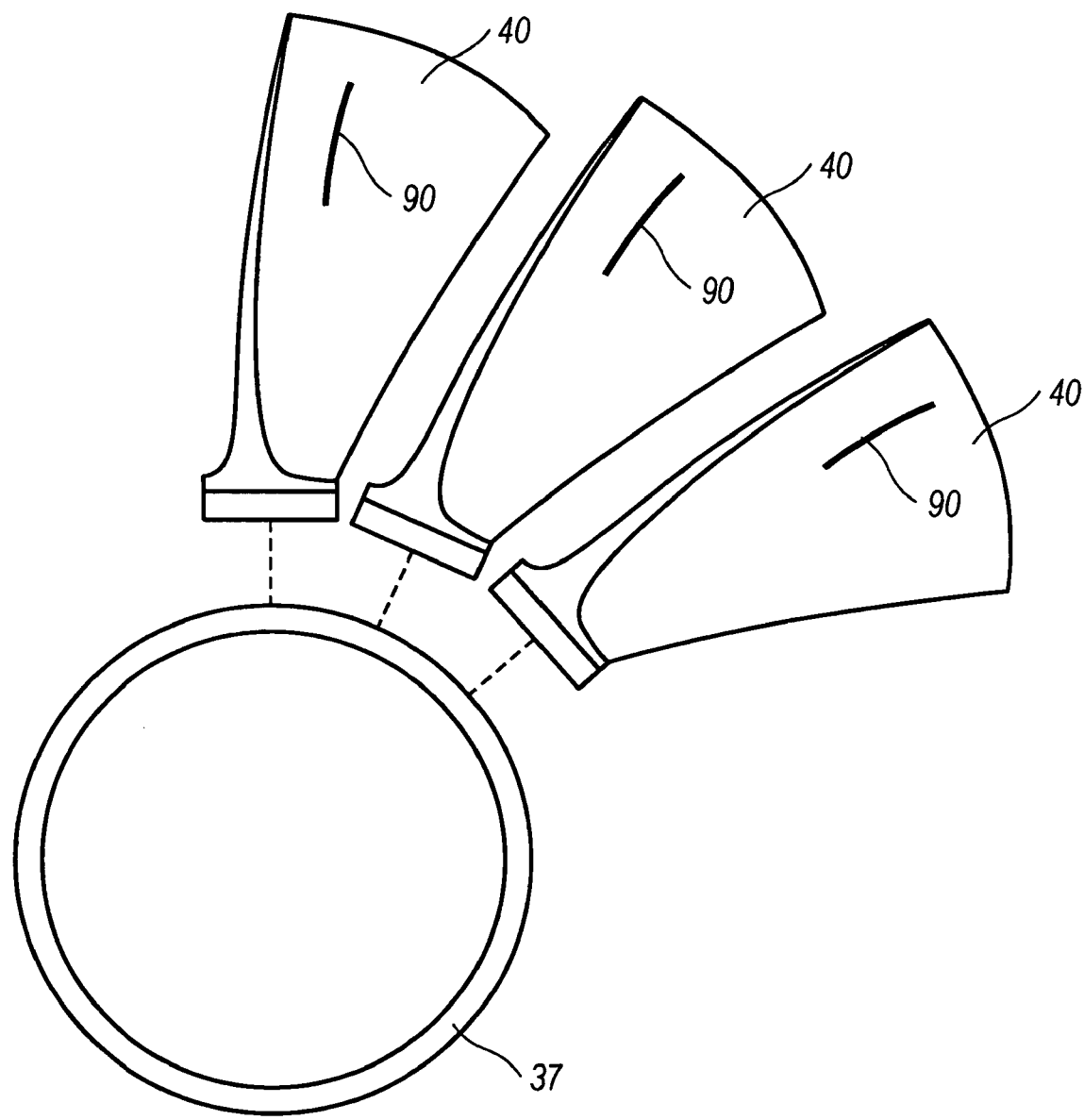
FIG. 14 is an exploded view of several treated turbofan blades in association with the fan disc to which the fan blades are mounted.
Figure 15:
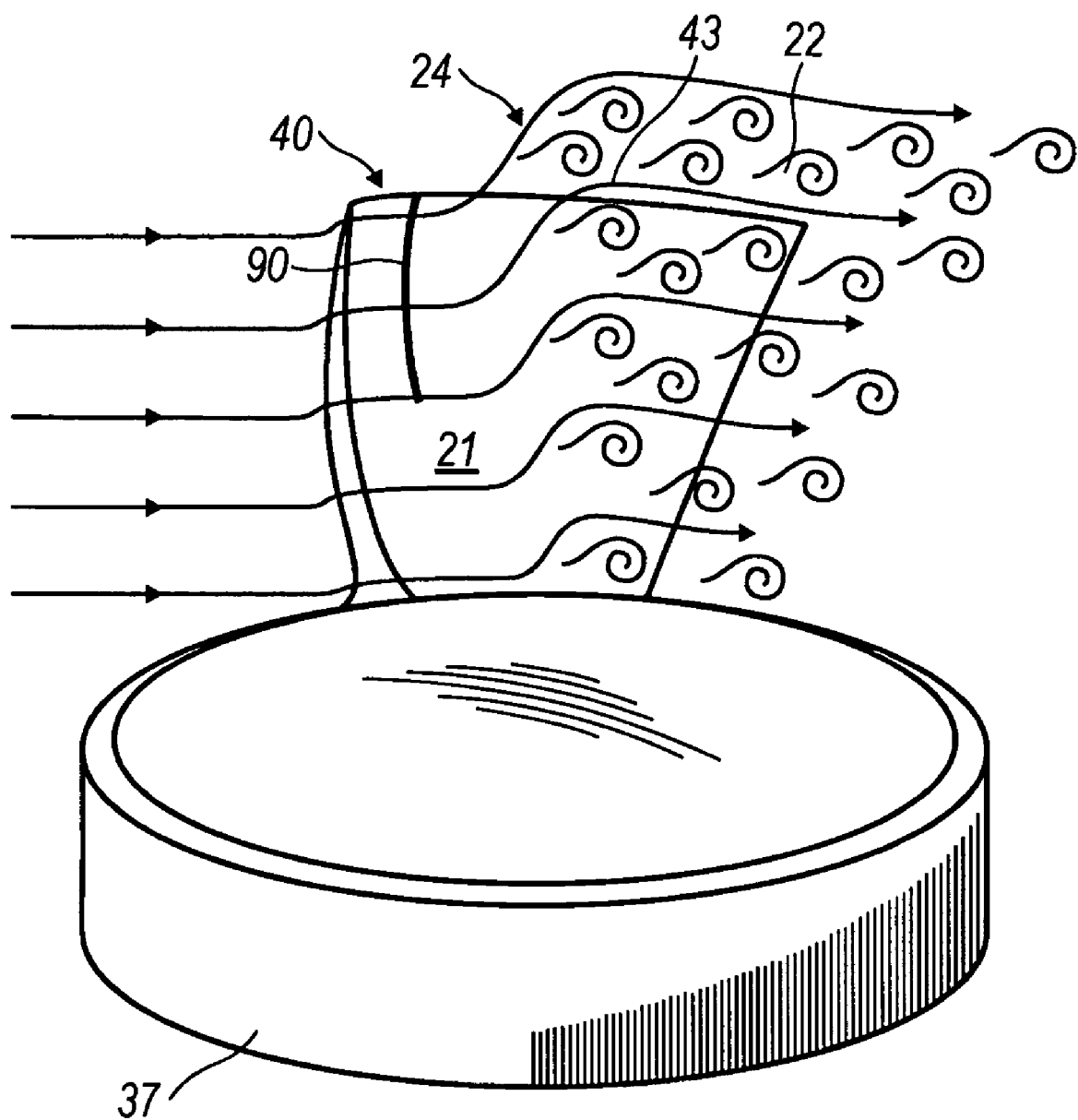
FIG. 15 is a schematic view of aerodynamic flow patterns occurring about an operating turbofan blade.

It is affirmed that the adapted turbofan blade assembly (see (35) in FIGS. 12 and 13) also constitutes an invention when configured according to the guidelines described herein.

Figure 11:
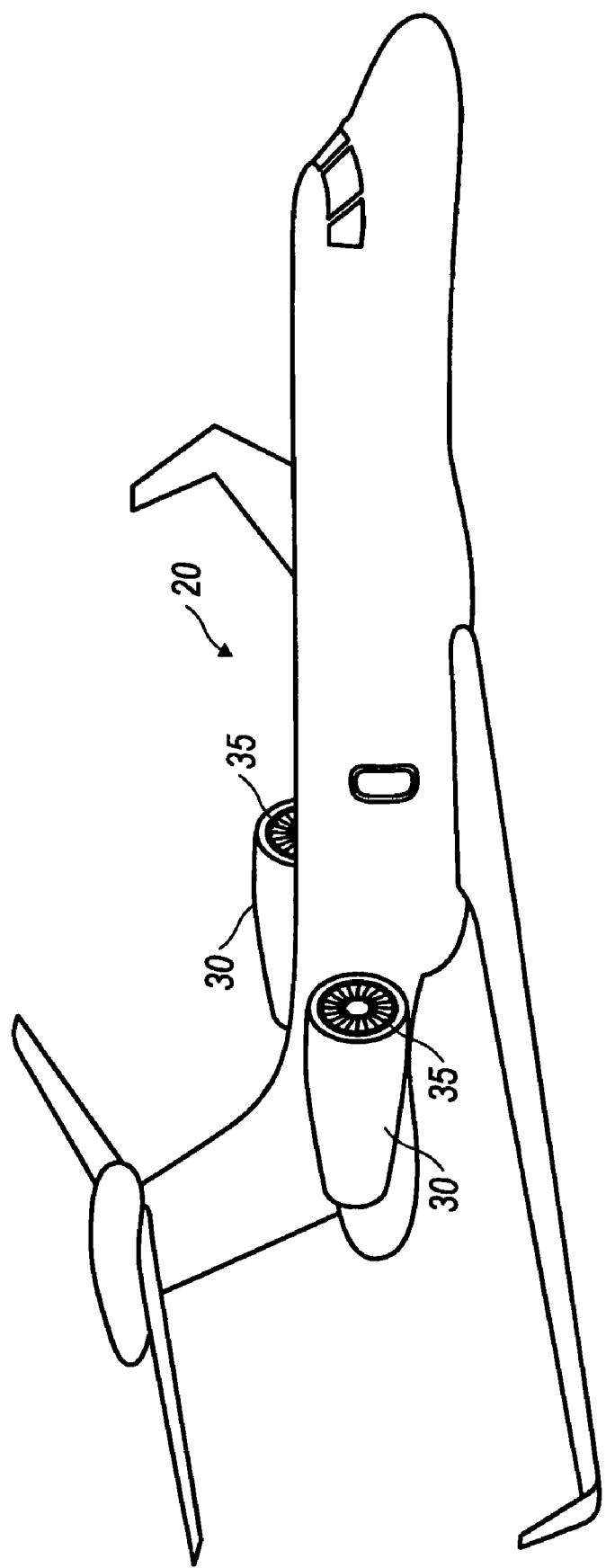
FIG. 11 is a perspective view of an aircraft upon which turbines, incorporating adapted turbofan blades, are utilized as powerplants.

An embodiment of the invention is also constituted by a turbofan based power unit (see (30) in FIG. 11) configured according to the presently disclosed invention, and which includes an inlet, an outlet and the fan blade assembly (35) operatively installed therein at a position between the inlet and the outlet. The turbofan fan blade assembly (35) has a plurality of blades (40); each including the control feature (90) as described and illustrated herein.

In another embodiment, the invention takes the form of a turbine-powered aircraft (see (20) in FIG. 11) having an aircraft fuselage and/or wing to which at least one turbofan based power unit (30) is mounted.

A turbofan fan blade is also disclosed that is adapted to reattach a separated boundary layer at a side surface of the blade during operation as a component in a turbofan assembly. The separated boundary layer reattachment device may take the form of a vortex generator, a turbulator, a transition strip in the form of a raised elevation above the smooth surface of the fan blade or a transition strip in the form of a recessed elevation below the smooth surface of said fan blade.

The invention is also constituted by a method for providing a turbofan fan blade configured to control a laminar-to-turbulent boundary layer transition at a side surface of the blade during operation as a component in a turbofan assembly. The method includes providing a turbofan fan blade with a laminar-to-turbulent boundary layer transition feature or means that produces a positionally stabilized boundary layer transition at a location downstream of the feature during operation of the turbofan assembly, thereby controlling unsteady aerodynamic forces experienced upon the blade during normal, or abnormal, operation.

In an alternative embodiment, the invention takes the form of a method for retrofitting an earlier manufactured turbofan blade with an adaptation as heretofore described. This method includes obtaining an earlier manufactured turbofan blade and providing a transition feature on the turbofan blade that causes a positionally stabilized boundary layer transition as described hereinabove.

In another embodiment, the invention takes the form of a method for producing a turbofan blade configured as described above, and includes adapting a turbofan fan blade with an appropriate transition feature.

Another embodiment is a method to stabilize an unsteady laminar-to-turbulent boundary layer transition in a turbofan based power unit of an aircraft and thereby controlling operationally induced stress levels to within acceptable ranges. The aircraft flies under conditions that cause at least laminar and turbulent boundary layers to form on at least one side surface of each blade with a boundary layer transition occurring therebetween. In another aspect of the invention, installation of the feature enables a reduction in flight-time based inspection intervals of the power unit at least in part, based on the fact that those who implement the present invention will be able to petition the appropriate regulators for longer inspection intervals.

As has been achieved by the applicants, and is described herein, utilization of the presently disclosed inventive arrangements, techniques and methods, have produced acceptable stress levels (measured in the aggregate) of less than fifty MPa at the blade/disc intersection, preferred and surprising stress levels on the order of twenty MPa and less, and especially preferred and extremely surprisingly low stress levels within the vicinity of the blade/disc on the order of ten MPa.

An important aspect of the invention is the enablement of maintaining specific fuel consumption, the operating line and/or the compressor stall line substantially equal to that of an identically configured power unit without the transition feature.

Alternatively, or in combination, a laminar-to-turbulent boundary layer transition feature or means may be located on the low-pressure side surface and/or the high-pressure side surface.

In one embodiment, the control feature can be located on at least one of the two side surfaces, and is constituted by a rough surface portion located on an essentially smooth surface portion of the turbofan fan blade. The rough surface portion includes an area of at least one of the two side surfaces having grit adhered thereto.

In at least one embodiment, the laminar-to-turbulent boundary layer transition feature is characterized by a surface deviation constituting a departure from the essentially smooth surface portion. The required surface deviation for successful implementation of this invention has heretofore been defined.

In a further embodiment, the departure from the essentially smooth surface portion can be constituted by a reduced-elevation surficial portion (67), compared to the essentially smooth surface portion (61) and/or can be constituted by a raised-elevation surficial portion (70), compared to the essentially smooth surface portion (61).

One implementation includes the raised-elevation surficial portion (70) being provided by applying an adhesive to at least one of the two side surfaces the adhesive exemplarily forming a strip having a thickness (77), a width (78) and a length (80), and the thickness of the adhesive strip constituting a thickness of the raised-elevation surficial portion. In another implementation, the raised-elevation surficial portion is provided by applying grit fixed to at least one of the two side surfaces using an adhesive, the grit establishing peak elevations of the raised-elevation surficial portion. In another implementation, the raised-elevation surficial portion can be developed either through bonding, spraying and/or mechanical, thermodynamic, electrical and/or chemical buildup upon at least one of the two side surfaces.

Figure 4:
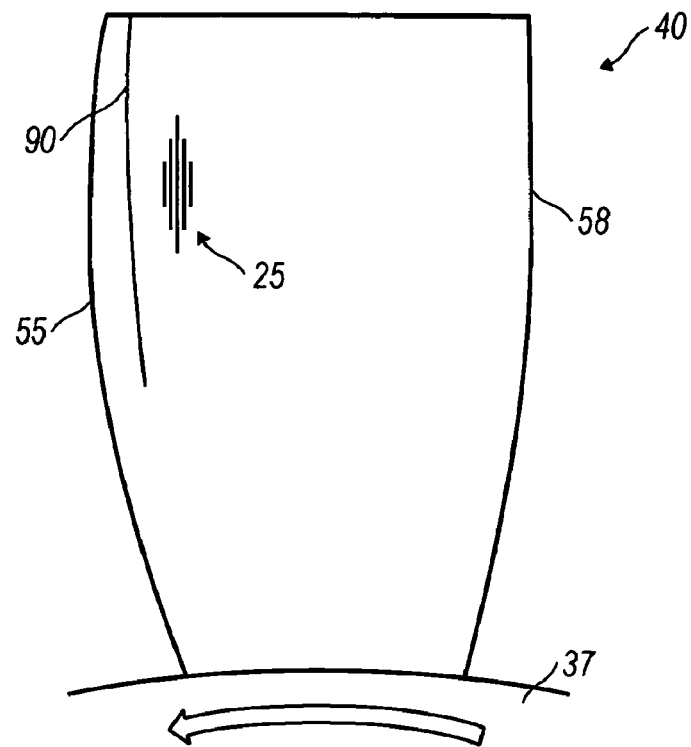
FIG. 4 is a schematic plan view of an adapted fan blade on a rotating disc with the transition feature located toward the leading edge of the fan blade.
Figure 5:
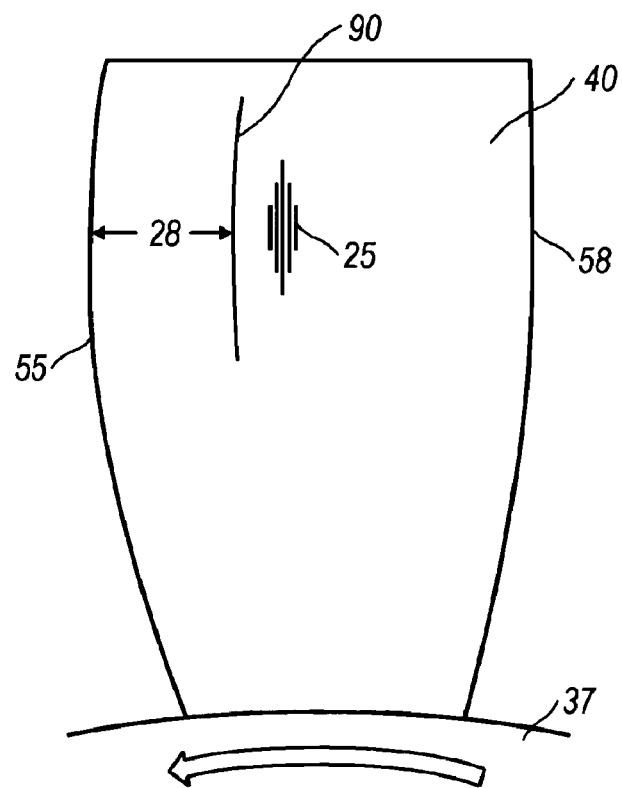
FIG. 5 is a schematic plan view of an alternatively adapted fan blade on a rotating disc with the transition feature located further rearward on the chord length than shown in FIG. 4.

The examples of FIGS. 4 and 8 depict a departure from the essentially smooth surface portion having a length greater than three inches and positioned in a spanwise direction along the chord of the blade between its leading and trailing edge. In an alternative embodiment, the departure from the essentially smooth surface portion is an elongate strip-shaped area of raised elevation having a length less than or equal to three inches. In each case, the width of the raised portion is preferably less than one-half inch, more preferably less than two-tenths of an inch; and most preferably, approximately one-tenth of an inch.

In a further embodiment, the departure from the essentially smooth surface portion is an elongate strip-shaped area of raised elevation having a tip-end (83) distanced approximately one-half inch from a tip (43) of the turbofan blade (40). Less preferably, the distance is at least one inch from the tip of the turbofan fan blade (see FIGS. 5 and 9).

Results and Charateristics of Tested Implementations of Feature (90)

By way of example, but not limitation, one configuration of the feature (90) that was tested achieved at least an 80% reduction (to less than 10 MPa) in peak measured stress in the vicinity of where the fan blade joins the disc; said embodiment was configured as an epoxy strip having grit embedded in the epoxy. The leading edge of the feature was located on the fan blade a distance (28) of 0.375 inches, or 5% of the fan blade chord, downstream of the fan blade leading edge. The tip (83) of the feature was located at the tip (43) of the fan blade (40) and said feature had a length (80) of 6 inches. The raised elevation (77) of the feature above the untreated fan blade surface was approximately 0.010 to 0.020 inches. The width (78) of the feature was approximately 0.10 to 0.20 inches and this described feature was installed on the low-pressure side of the fan blade and on the high-pressure side of the fan blade at the locations identified herein.

Another exemplary embodiment of the feature (90) that was tested achieved at least an 80% reduction (to less than 10 MPa) in peak measured stress in the vicinity of where the fan blade joins the disc; said embodiment was configured as an epoxy strip having grit embedded in the epoxy. The leading edge of the feature was located on the fan blade a distance (28) of 0.375 inches, or 5% of the fan blade chord, downstream of the fan blade leading edge. The tip (83) of the feature was located at the tip (43) of the fan blade (40) and said feature had a length (80) of 6 inches. The raised elevation (70) of said feature (90) above the untreated fan blade surface was approximately 0.010 to 0.020 inches. The width (78) of said feature (90) was approximately 0.10 to 0.20 inches and said feature was installed on the low-pressure side of the fan blade.

Yet another exemplary embodiment of the feature (90) that was tested achieved at least an 80% reduction (to approximately 12 MPa) in peak measured stress in the vicinity of where the fan blade joins the disc; said embodiment was configured as an epoxy strip having grit embedded in the epoxy. The leading edge of the feature was located on the fan blade a distance (28) of 0.375 inches, or 5% of the fan blade chord, downstream of the fan blade leading edge. The tip (83) of the feature (90) was located at the tip (43) of the fan blade (40) and said feature had a length (80) of 3 inches. The raised elevation (70) of said feature (90) above the untreated fan blade surface was approximately 0.010 to 0.020 inches, its width (78) was approximately 0.10 to 0.20 inches and said feature was installed on the low-pressure side of the fan blade.

Another exemplary embodiment of the feature (90) that was tested achieved at least an 80% reduction (to approximately 16 MPa) in peak measured stress in the vicinity of where the fan blade joins the disc; said embodiment was configured as an epoxy strip having grit embedded in the epoxy. The leading edge of the feature was located on the fan blade a distance (28) of 0.375 inches, or 5% of the fan blade chord, downstream of the fan blade leading edge. The tip (83) of the feature (90) was located 0.5 inches from the fan blade tip (43) and said feature had a length (80) of 2.5 inches. The raised elevation (70) of said feature (90) above the untreated fan blade surface was approximately 0.010 to 0.020 inches, its width (78) was approximately 0.10 to 0.20 inches and said feature was installed on the low-pressure side of the fan blade.

Yet a further exemplary embodiment of the feature (90) that was tested achieved at least an 80% reduction (to approximately 18 MPa) in peak measured stress in the vicinity of where the fan blade joins the disc; said embodiment was configured as an epoxy strip having grit embedded in the epoxy. The leading edge of the feature was located on the fan blade a distance (28) of 0.375 inches, or 5% of the fan blade chord, downstream of the fan blade leading edge. The tip (83) of the feature (90) was located 0.5 inches from the fan blade tip (43) and said feature had a length (80) of 2 inches. The raised elevation (70) of said feature (90) above the untreated fan blade surface was approximately 0.010 to 0.020 inches, its width (78) was approximately 0.10 to 0.20 inches and said feature was installed on the low-pressure side of the fan blade.

The illustration of FIG. 9 demonstrates another embodiment of the feature (90) that was tested achieved at least an 80% reduction (to approximately 14 MPa) in peak measured stress in the vicinity of where the fan blade joins the disc; said embodiment was configured as an epoxy strip having grit embedded in the epoxy. The leading edge of the feature was located on the fan blade a distance (28) of 2.25 inches, or 30% of the fan blade chord, downstream of the fan blade leading edge. The tip (83) of the feature (90) was located 0.5 inches from the fan blade tip (43) and said feature had a length (80) of 2.5 inches. The raised elevation (70) of said feature (90) above the untreated fan blade surface was approximately 0.010 to 0.020 inches, its width (78) was approximately 0.10 to 0.20 inches and said feature was installed on the low-pressure side of the fan blade.

A further exemplary embodiment of the feature (90) that was tested achieved at least an 80% reduction (to approximately 16 MPa) in peak measured stress in the vicinity of where the fan blade joins the disc; said embodiment was configured as an epoxy strip having no grit embedded in the epoxy. The leading edge of the feature was located on the fan blade a distance (28) of 2.25 inches, or 30% of the fan blade chord, downstream of the fan blade leading edge. The tip (83) of the feature (90) was located 0.5 inches from the fan blade tip (43) and said feature had a length (80) of 2.5 inches. The raised elevation (70) of said feature (90) above the untreated fan blade surface was approximately 0.010 to 0.020 inches, its width (78) was approximately 0.10 to 0.20 inches and said feature was installed on the low-pressure side of the fan blade.

Still another exemplary embodiment of the feature (90) that was tested achieved at least an 80% reduction (to approximately 18 MPa) in peak measured stress in the vicinity of where the fan blade joins the disc; said embodiment was configured as an epoxy strip having no grit embedded in the epoxy. The leading edge of the feature was located on the fan blade a distance (28) of 2.25 inches, or 30% of the fan blade chord, downstream of the fan blade leading edge. The tip (83) of the feature (90) was located 0.5 inches from the fan blade tip (43) and said feature had a length (80) of 2.0 inches. The raised elevation (70) of said feature (90) above the untreated fan blade surface was approximately 0.010 to 0.020 inches, its width (78) was approximately 0.10 to 0.20 inches and said feature was installed on the low-pressure side of the fan blade.

Still a further exemplary embodiment of the feature (90) that was tested achieved at least a 75% reduction (to approximately 27 MPa) in peak measured stress in the vicinity of where the fan blade joins the disc; said embodiment was configured as an epoxy strip having no grit embedded in the epoxy. The leading edge of the feature was located on the fan blade a distance (28) of 2.25 inches, or 30% of the fan blade chord, downstream of the fan blade leading edge. The tip (83) of the feature (90) was located 0.5 inches from the fan blade tip (43) and said feature had a length (80) of 2.0 inches. The raised elevation (70) of said feature (90) above the untreated fan blade surface was approximately 0.005 to 0.007 inches, its width (78) was approximately 0.10 to 0.20 inches and said feature was installed on the low-pressure side of the fan blade.

Yet another exemplary embodiment of the feature (90) that was tested achieved at least an 80% reduction (to approximately 16 MPa) in peak measured stress in the vicinity of where the fan blade joins the disc; said embodiment was configured as an epoxy strip having no grit embedded in the epoxy. The leading edge of the feature was located on the fan blade a distance (28) of 2.25 inches, or 30% of the fan blade chord, downstream of the fan blade leading edge. The tip (83) of the feature (90) was located 0.5 inches from the fan blade tip (43) and said feature had a length (80) of 2.5 inches. The raised elevation (70) of said feature (90) above the untreated fan blade surface was approximately 0.009 to 0.011 inches, its width (78) was approximately 0.10 to 0.20 inches and said feature was installed on the low-pressure side of the fan blade.

The invention claimed is:

1. A method for limiting stress levels in an aircraft-powering turbofan assembly by controlling unstable movement of laminar-to-turbulent boundary layer transition on fan blades of the turbofan assembly during aircraft flight, said method comprising: including on a flying aircraft, an aircraft-powering turbofan assembly comprising multiple fan blades mounted on a fan disc and each of said fan blades having a leading edge, a trailing edge, and two side surfaces that comprise a high-pressure side surface and a low-pressure side surface, each blade also having a relatively long chord length, said turbofan assembly being configured such that a laminar-to-turbulent boundary layer transition range occurs on the low-pressure side surface of each of said fan blades during flight; providing a plurality of said fan blades each with a laminar-to-turbulent boundary layer transition control feature at the low-pressure side surface of the respective fan blade, positioning each said control feature on the respective blade at a position that will initiate and positionally stabilize the laminar-to-turbulent boundary layer transition to a location upon the respective fan blade between said control feature and the respective fan blade's trailing edge that will substantially maintain an aggregate limited stress occurring in the turbofan assembly at a mounting of the respective fan blade to the fan disc to below fifty megapascals during flight within the aircraft's operating envelope.

2. A method for limiting stress levels in an aircraft-powering turbofan assembly by controlling unstable movement of laminar-to-turbulent boundary layer transition on fan blades of the turbofan assembly during aircraft flight, said method comprising: including on a flying aircraft, an aircraft-powering turbofan assembly comprising multiple fan blades mounted on a fan disc and each of said fan blades having a leading edge, a trailing edge, and two side surfaces that comprise a high-pressure side surface and a low-pressure side surface, each blade also having a relatively long chord length, said turbofan assembly being configured such that a laminar-to-turbulent boundary layer transition range occurs on the low-pressure side surface of each of said fan blades during flight; providing a plurality of said fan blades each with a laminar-to-turbulent boundary layer transition control feature at the low-pressure side surface of the respective fan blade, positioning each said control feature on the respective blade at a position that will initiate and positionally stabilize the laminar-to-turbulent boundary layer transition to a location upon the respective fan blade between said control feature and the respective fan blade's trailing edge that will substantially maintain an aggregate limited stress occurring in the turbofan assembly at a mounting of the respective fan blade to the fan disc to below twenty megapascals during flight within the aircraft's operating envelope.

3. A method for limiting stress levels in an aircraft-powering turbofan assembly by controlling unstable movement of laminar-to-turbulent boundary layer transition on fan blades of the turbofan assembly during aircraft flight, said method comprising: including on a flying aircraft, an aircraft-powering turbofan assembly comprising multiple fan blades mounted on a fan disc and each of said fan blades having a leading edge, a trailing edge, and two side surfaces that comprise a high-pressure side surface and a low-pressure side surface, each blade also having a relatively long chord length, said turbofan assembly being configured such that a laminar-to-turbulent boundary layer transition range occurs on the low-pressure side surface of each of said fan blades during flight, providing a plurality of said fan blades each with a laminar-to-turbulent boundary layer transition control feature at the low-pressure side surface of the respective fan blade, positioning each said control feature on the respective blade at a position that will initiate and positionally stabilize the laminar-to-turbulent boundary layer transition to a location upon the respective fan blade between said control feature and the respective fan blade's trailing edge that will substantially maintain an aggregate limited stress occurring in the turbofan assembly at a mounting of the respective fan blade to the fan disc to below ten megapascals during flight within the aircraft's operating envelope.

4. The method as recited in any one of claims 1-3, wherein said aggregate limited stress measured in the mounting of the respective fan blade to the fan disc is composed at least partially by fluctuating stresses.

5. The method as recited in claim 4, wherein said fluctuating stresses are at least partially caused by an unsteady aerodynamic force associated with an oscillatory chordwise translation of said boundary layer transition point along the chord of the respective fan blade.

6. The method as recited in any one of claims 1-3, further comprising: utilizing said laminar-to-turbulent boundary layer transition control feature in response to detecting structural degradation in a similarly configured turbofan assembly without the control feature.

7. The method as recited in any one of claims 1-3, further comprising: utilizing a strain gauge to assess the aggregate stress level experienced in the turbofan assembly proximate the mounting of the respective fan blade to the fan disc during flight.

8. The method as recited in any one of claims 1-3, wherein said blades are operating under non-stall conditions.

9. The method as recited in any one of claims 1-3, wherein the flight envelope of said aircraft ranges from zero to seventy thousand feet pressure altitude and the fan blades are in stall-free operation.

10. The method as recited in any one of claims 1-3, further comprising: enabling a reduction in flight-time based inspection intervals of the turbofan assembly.

11. The method as recited in any one of claims 1-3, further comprising: enabling a reduction in flight-time based inspection intervals of constituent components of the turbofan assembly.

12. The method as recited in claim 11, wherein said fan blades are constituent components of the turbofan assembly.

13. The method as recited in claim 11, wherein said fan disc is a constituent component of the turbofan assembly.

14. The method as recited in any one of claims 1-3, further comprising: obtaining the approval of regulatory bodies for reduced frequency, flight-time based inspection intervals because of limited stress levels enabled by the utilization of the laminar-to-turbulent boundary layer transition control feature.

15. The method as recited in any one of claims 1-3, further comprising: maintaining a specific fuel consumption when said laminar-to-turbulent boundary layer transition control feature is included that is substantially equal to the specific fuel consumption of a similarly configured turbofan assembly without said control feature.

16. The method as recited in any one of claims 1-3, further comprising: communicating said limited stress levels in product promotions.

17. The method as recited in any one of claims 1-3, further comprising: communicating said limited stress levels for purposes of at least one of flight envelope expansion, product differentiation and sales promotion.

18. The method as recited in any one of claims 1-3, wherein said laminar-to-turbulent boundary layer transition control feature is located on said low-pressure side surface on an essentially smooth surface portion located between said leading and trailing edges and said feature being characterized by a surface deviation constituting a departure from said essentially smooth surface portion.

19. The method as recited in claim 18, wherein said departure from said essentially smooth surface portion is constituted by a reduced-elevation surficial portion, compared to said essentially smooth surface portion.

20. The method as recited in claim 18, wherein said departure from said essentially smooth surface portion is constituted by a raised-elevation surficial portion, compared to said essentially smooth surface portion.

21. The method as recited in claim 20, wherein said raised-elevation surficial portion is provided by applying an adhesive to said low-pressure side surface, the thickness of said adhesive constituting the thickness of said raised-elevation surficial portion.

22. The method as recited in claim 20, wherein said raised-elevation surficial portion is provided by applying grit fixed to said low-pressure side surface using an adhesive, said grit establishing peak elevations of said raised-elevation surficial portion.

23. The method as recited in claim 20, wherein said raised-elevation surficial portion is formed by at least one of bonding, mechanical, electrical, thermodynamic and chemical based techniques upon at least one of said two side surfaces.

24. The method as recited in claim 18, wherein said departure from said essentially smooth surface portion is greater than three inches long and is positioned chordwise between said fan blade leading edge and said fan blade trailing edge.

25. The method as recited in claim 18, wherein said departure from said essentially smooth surface portion is an elongate strip-shaped area of raised elevation having a length of three or less inches and positioned chordwise between said fan blade leading edge and said fan blade trailing edge.

26. The method as recited in claim 18, wherein said departure from said essentially smooth surface portion is an elongate strip-shaped area of raised elevation having a width of less than one-half inch.

27. The method as recited in claim 18, wherein said departure from said essentially smooth surface portion is an elongate strip-shaped area of raised elevation having a width of less than two-tenths of an inch.

28. The method as recited in claim 18, wherein said departure from said essentially smooth surface portion is an elongate strip-shaped area of raised elevation having a width of approximately one-tenth of an inch.

29. The method as recited in claim 18, wherein said departure from said essentially smooth surface portion is an elongate strip-shaped area of raised elevation having a tip-end distanced approximately one-half inch from a tip of the respective turbofan blade.

30. The method as recited in claim 18, wherein said departure from said essentially smooth surface portion is an elongate strip-shaped area of raised elevation having a tip-end distanced at least one-half inch from a tip of the respective turbofan blade.

31. The method as recited in claim 18, wherein said departure from said essentially smooth surface portion is an elongate strip-shaped area of raised elevation positioned behind said leading edge and forward of the laminar to turbulent boundary layer transition point on the untreated fan blade.

32. A method for modifying an existing turbofan assembly having a plurality of unmodified fan blades mounted on a fan disc, each of said plurality of unmodified fan blades having a leading edge, a trailing edge, a first side and a second side, the method comprising the steps of: determining a range of translation of an unstable transition point between a laminar and a turbulent boundary layer on at least one of the first side and the second side of at least one of said plurality of unmodified fan blades, the range of translation of the unstable transition point having a foremost position closest to the leading edge; and modifying the existing turbofan assembly by positioning a boundary layer transition point stabilizing element on at least one of the first side and the second side of at least one of said plurality of unmodified fan blades between the leading edge and the foremost position of the unstable transition point, thereby reducing the range of translation of the unstable transition point between the laminar and the turbulent boundary layer by initializing transition from a laminar to turbulent boundary layer upstream of the determined range of translation and thereby minimizing the range of translation of said initiated transition boundary point during use of the modified turbofan assembly, and reducing aggregate stresses occurring at a mounting of at least one of said plurality of modified fan blades to the fan disc in the modified turbofan assembly to below a predetermined threshold during use of the modified turbofan assembly.

33. The method as recited in claim 32, wherein the predetermined threshold is fifty megapascals during use of the turbo fan assembly.

34. The method as recited in claim 32, wherein the predetermined threshold is twenty megapascals during use of the turbo fan assembly.

35. The method as recited in claim 32, wherein the predetermined threshold is ten megapascals during use of the turbo fan assembly.

36. The method as recited in claim 32, wherein the unstable translation of said laminar to turbulent boundary layer transition point includes an oscillatory chordwise translation on at least one of said plurality of unmodified fan blades.

37. The method as recited in claim 32, further comprising the step of enabling a reduction in frequency of flight-time based inspections of the existing turbofan assembly.

38. The method as recited in claim 32, further comprising the step of expanding a flight envelope of the modified turbofan assembly.

39. The method as recited in claim 32, wherein said transition stabilizing element is at least one of (1) a vortex generator and (2) a turbulator and (3) a transition strip in the form of a raised elevation above a smooth surface of each of said plurality of fan blades and (4) a transition strip in the form of a recessed elevation below a smooth surface of each of said plurality of fan blades.

40. The method as recited in claim 39, wherein said raised elevation is provided by applying an adhesive to at least one of the first side and the second side, a thickness of said adhesive constituting the thickness of said raised-elevation.

41. The method as recited in claim 39, wherein said raised elevation is provided by applying grit to at least one of the first side and the second side using an adhesive, said grit establishing peak elevations of said raised-elevation.

42. The method as recited in claim 39, wherein said raised and/or recessed elevations are created by at least one of bonding, spraying, forming, or the use of any mechanical, electrical, thermodynamic and/or chemical based procedure used to develop said raised or recessed elevations upon at least one of the two side surfaces.

43. The method as recited in claim 39, wherein said raised elevation and said recessed elevation include an elongate strip-shaped area having a length of greater than three inches.

44. The method as recited in claim 39, wherein said raised elevation and said recessed elevation include an elongate strip-shaped area having a length of three inches or less.

45. The method as recited in claim 39, wherein said raised elevation and said recessed elevation include an elongate strip-shaped area having a width of less than one-half inch.

46. The method as recited in claim 39, wherein said raised elevation and said recessed elevation include an elongate strip-shaped area having a width of less than two-tenths of an inch.

47. The method as recited in claim 39, wherein said raised elevation and said recessed elevation include an elongate strip-shaped area having a width of approximately one-tenth of an inch.

48. The method as recited in claim 39, wherein said raised elevation and said recessed elevation include an elongate strip-shaped area having a tip-end distanced approximately one-half inch or less from a tip of each of said plurality of fan blades.

49. The method as recited in claim 39, wherein said raised elevation and said recessed elevation include an elongate strip-shaped area having a tip-end distanced at least one-half inch from a tip of each of said plurality of fan blades.

* * * * *